US009868579B2

(12) United States Patent
Ikeda et al.

(10) Patent No.: US 9,868,579 B2
(45) Date of Patent: *Jan. 16, 2018

(54) OXYGEN ABSORBING AGENT COMPOSITION AND OXYGEN ABSORBING AGENT PACKAGE

(71) Applicant: MITSUBISHI GAS CHEMICAL COMPANY, INC., Tokyo (JP)

(72) Inventors: Shinichi Ikeda, Tokyo (JP); Satoshi Okada, Kanagawa (JP); Shinpei Iwamoto, Kanagawa (JP)

(73) Assignee: MITSIBISHI HAS CHEMICAL COMPANY, INC., Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 14/424,750

(22) PCT Filed: Aug. 29, 2013

(86) PCT No.: PCT/JP2013/073204
§ 371 (c)(1),
(2) Date: Feb. 27, 2015

(87) PCT Pub. No.: WO2014/034800
PCT Pub. Date: Mar. 6, 2014

(65) Prior Publication Data
US 2015/0232251 A1 Aug. 20, 2015

(30) Foreign Application Priority Data

Aug. 29, 2012 (JP) .................. 2012-188565

(51) Int. Cl.
B65D 81/26 (2006.01)
B01J 20/28 (2006.01)
B01D 53/81 (2006.01)
C09K 15/04 (2006.01)
C09K 15/06 (2006.01)
A23L 3/34 (2006.01)
B01J 31/22 (2006.01)
B01J 20/14 (2006.01)
A23L 3/3436 (2006.01)

(52) U.S. Cl.
CPC .......... B65D 81/268 (2013.01); A23L 3/3436 (2013.01); B01D 53/81 (2013.01); B01J 20/14 (2013.01); B01J 31/2239 (2013.01); C09K 15/04 (2013.01); C09K 15/06 (2013.01)

(58) Field of Classification Search
None
See application file for complete search history.

(56) References Cited

U.S. PATENT DOCUMENTS

| 4,839,323 | A | 6/1989 | Goe et al. | |
| 4,898,982 | A * | 2/1990 | Hussmann | C07C 41/09 568/58 |
| 5,157,157 | A | 10/1992 | Choi et al. | |
| 5,211,875 | A | 5/1993 | Speer et al. | |
| 5,346,644 | A | 9/1994 | Speer et al. | |
| 5,350,622 | A | 9/1994 | Speer et al. | |
| 5,529,833 | A | 6/1996 | Speer et al. | |
| 5,700,554 | A | 12/1997 | Speer et al. | |
| 5,925,798 | A * | 7/1999 | Gambell | B01J 23/12 423/252 |
| 6,063,503 | A | 5/2000 | Hatakeyama et al. | |
| 6,254,803 | B1 | 7/2001 | Matthews et al. | |
| 6,254,804 | B1 | 7/2001 | Matthews et al. | |
| 7,056,565 | B1 | 6/2006 | Cai et al. | |
| 7,097,890 | B1 | 8/2006 | Ching et al. | |
| 9,428,692 | B2 * | 8/2016 | Okada | A23L 3/3436 |
| 9,518,148 | B2 * | 12/2016 | Iwamoto | C08G 63/181 |
| 2002/0102424 | A1 | 8/2002 | Yang et al. | |
| 2003/0012896 | A1 | 1/2003 | Ching et al. | |
| 2003/0235708 | A1 | 12/2003 | Yang et al. | |
| 2006/0180790 | A1 | 8/2006 | Deshpande et al. | |
| 2007/0082828 | A1 * | 4/2007 | Nalesnik | C07C 211/55 508/545 |
| 2008/0014395 | A1 * | 1/2008 | Kitahara | B32B 27/08 428/36.5 |
| 2008/0258105 | A1 | 10/2008 | Kitahara | |
| 2014/0225034 | A1 | 8/2014 | Okada et al. | |
| 2014/0308405 | A1 * | 10/2014 | Okada | B32B 27/327 426/106 |
| 2014/0373485 | A1 * | 12/2014 | Okada | B65D 81/24 53/428 |
| 2015/0298887 | A1 * | 10/2015 | Okada | B65D 81/266 604/403 |
| 2015/0368022 | A1 * | 12/2015 | Okada | B65D 81/266 53/400 |
| 2016/0008800 | A1 * | 1/2016 | Iwamoto | B01J 20/22 252/188.28 |
| 2016/0009993 | A1 * | 1/2016 | Ikeda | B01D 53/02 252/188.28 |

(Continued)

FOREIGN PATENT DOCUMENTS

| CA | 745651 | 1/1966 |
| CN | 1306521 | 8/2001 |

(Continued)

OTHER PUBLICATIONS

Office Action dated Dec. 4, 2015 in U.S. Appl. No. 14/240,609 (published as US 2014/0225034.
Search report from PCT/JP2013/073204, dated Oct. 29, 2013.
International Preliminary Examination Report in PCT/JP2013/073204 dated Mar. 3, 2015.

Primary Examiner — Joseph D Anthony

(74) Attorney, Agent, or Firm — Greenblum & Bernstein, P.L.C.

(57) ABSTRACT

The present invention provides an oxygen absorbing agent composition comprising a compound (A) having two or more tetralin rings, and a transition metal catalyst.

8 Claims, No Drawings

(56) References Cited

U.S. PATENT DOCUMENTS

2016/0017092 A1* 1/2016 Iwamoto ................ B32B 27/36
        428/480
2016/0031628 A1* 2/2016 Ito .......................... B01D 53/02
        252/188.28

FOREIGN PATENT DOCUMENTS

| CN | 101193976 | 6/2008 |
|---|---|---|
| EP | 0507207 | 3/1992 |
| GB | 2000775 | 7/1978 |
| JP | 51-136845 | 11/1976 |
| JP | 5-115776 | 5/1993 |
| JP | 7-165776 | 6/1995 |
| JP | 9-234832 | 9/1997 |
| JP | 11-80111 | 3/1999 |
| JP | 2000-319207 | 11/2000 |
| JP | 2001-252560 | 9/2001 |
| JP | 2003-521552 | 7/2003 |
| JP | 2007-186604 | 7/2007 |
| JP | 2008050403 | 3/2008 |
| JP | 2009-511596 | 3/2009 |
| JP | 2010-158617 | 7/2010 |
| SU | 910185 | 3/1982 |
| WO | 1999-048963 | 9/1999 |
| WO | 99/67225 | 12/1999 |
| WO | 1999-067225 | 12/1999 |
| WO | 2013-031877 | 3/2013 |
| WO | 2013-089268 | 6/2013 |
| WO | 2013-118882 | 8/2013 |

\* cited by examiner

OXYGEN ABSORBING AGENT COMPOSITION AND OXYGEN ABSORBING AGENT PACKAGE

TECHNICAL FIELD

The present invention relates to an oxygen absorbing agent composition and an oxygen absorbing agent package using the oxygen absorbing agent composition.

BACKGROUND ART

For the purpose of preventing oxidation and performing long-term storing of various goods (objects to be stored) tending to be affected by oxygen and accordingly deteriorated or degraded, typified by, for example, food, beverages, pharmaceuticals and cosmetics, there have been used oxygen absorbing agents. The oxygen absorbing agents are used for removing the oxygen inside the vessels containing these goods.

As oxygen absorbing agents, from the viewpoint of the oxygen absorbing performance, easiness in handling and safety, there have generally been used oxygen absorbing agents including iron powder as the main reaction agent. However, such iron-based oxygen absorbing agents respond to metal detectors, and hence it has been difficult to perform foreign matter inspection by using metal detectors. Packages enclosing iron-based oxygen absorbing agents have possibility of ignition and hence cannot be heated with microwave ovens. In addition, iron-based oxygen absorbing agents take advantage of the oxidation reaction of iron powder, and hence exhibit the oxygen absorption effect thereof only for the objects to be stored which are high-moisture systems; thus, the objects of the iron-based oxygen absorbing agents are limited to the objects to be stored which are high-moisture systems.

By constituting vessels with multilayer materials provided with oxygen absorbing layers composed of oxygen-absorbing resin compositions prepared by mixing iron-based oxygen absorbing agents with thermoplastic resins, packaging vessels have been developed in such a way that the gas barrier property of the vessels is achieved and the oxygen absorption function is imparted to the vessels themselves (see Patent Document 1). However, such vessels also have a problem such that such vessels cannot be used for performing foreign matter inspection with metal detectors, cannot be heated with microwave ovens, and are adaptable only to the objects to be stored which are high-moisture systems. In addition, such vessels also suffer from a problem of insufficient internal visibility due to opacity.

From the aforementioned circumstances, oxygen absorbing agents including an organic substance as a main reaction agent are demanded. As the oxygen absorbing agent including an organic substance as a main reaction agent, an oxygen absorbing agent including ascorbic acid as the main agent is known (see Patent Document 2).

On the other hand, an oxygen-absorbing resin composition being composed of a resin and a transition metal catalyst and having an oxygen-capturing property is known. For example, a resin composition is known which is composed of a polyamide, in particular a xylylene group-containing polyamide as an oxidizable organic component and a transition metal catalyst; in addition, a resin composition having an oxygen-capturing function, and an oxygen absorbing agent, a packaging material, a multilayer laminated film for packaging obtained by molding such a resin composition are known (see Patent Document 3).

As an oxygen-absorbing resin composition requiring no moisture for oxygen absorption, an oxygen-absorbing resin composition composed of a resin having carbon-carbon unsaturated bonds and a transition metal catalyst is also known (see Patent Document 4).

In addition, as a composition to scavenge oxygen, a composition composed of a polymer including substituted cyclohexene functional group or a low molecular weight substance with the cyclohexene ring bonded thereto and a transition metal is known (see Patent Document 5).

PATENT DOCUMENT

Patent Document 1: Japanese Patent Laid-Open No. H09-234832
Patent Document 2: Japanese Patent Laid-Open No. S51-136845
Patent Document 3: Japanese Patent Laid-Open No. 2001-252560
Patent Document 4: Japanese Patent Laid-Open No. H05-115776
Patent Document 5: National Publication of International Patent Application No. 2003-521552

SUMMARY OF THE INVENTION

Problems to be Solved by the Invention

However, the resin composition of Patent Document 2 has a problem such that the resin composition is in the first place low in oxygen absorption performance, develops the effect only for an object to be stored which is a high-moisture system, and is comparatively expensive.

The resin composition of Patent Document 3 develops the oxygen absorption function through the oxidation of the xylylene group-containing polyamide resin by including the transition metal catalyst, and accordingly suffers from a problem such that the oxidation degradation of the resin causes the strength degradation of the resin to degrade the strength of the packaging container itself. In addition, the resin composition has a problem to be solved such that the oxygen absorption performance thereof is still insufficient, and the resin composition develops the effect thereof only for objects to be stored which are high-moisture systems.

The oxygen-absorbing resin composition of Patent Document 4 also suffers from a problem such that the breakage of the polymer chain caused by the oxidation of the resin produces low molecular weight organic compounds to be odor components so as to increase the odor intensity after the absorption of oxygen as compared to before the absorption of oxygen.

The composition of Patent Document 5 suffers from a problem such that the composition requires the use of a specific material including a cyclohexene functional group, and the material comparatively tends to generate odor, and, in addition, is comparatively expensive.

The present invention has been achieved in view of the aforementioned circumstances, and takes as its object the provision of a novel oxygen absorbing agent composition being capable of realizing an oxygen absorbing agent not responding to a metal detector, being free from the occurrence of odor before and after the absorption of oxygen and having an excellent oxygen absorption performance, and the provision of an oxygen absorbing agent package using the oxygen absorbing agent composition.

Means for Solving the Problems

The present inventors made a diligent study on the oxygen absorbing agent composition, and consequently have perfected the present invention by discovering the use of an oxygen absorbing agent composition including a compound having two or more tetralin rings in the molecule thereof and a transition metal catalyst.

Specifically, the present invention is as follows.

[1]
An oxygen absorbing agent composition comprising:
a compound (A) having two or more tetralin rings; and
a transition metal catalyst.

[2]
The oxygen absorbing agent composition according to [1], wherein the compound (A) is a compound represented by at least any one selected from the group consisting of the following general formulas (1) to (6):

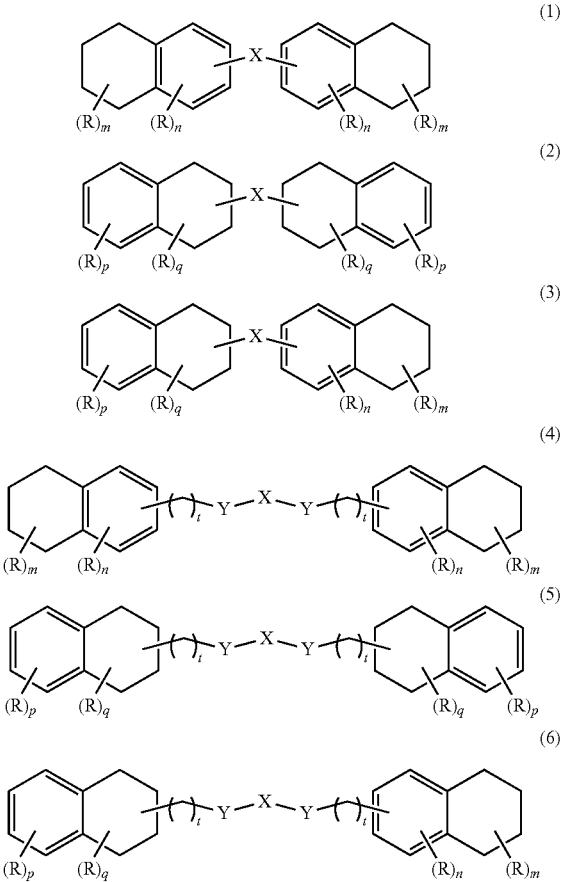

(wherein R each independently represents a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group; R may each further have a substituent; one or more hydrogen atom is bonded to a benzylic position of at least one tetralin ring; X represents a divalent group containing at least one group selected from the group consisting of an aromatic hydrocarbon group, a saturated or unsaturated alicyclic hydrocarbon group, a linear or branched saturated or unsaturated aliphatic hydrocarbon group and a heterocyclic group; Y represents an ester group or an amide group; and m represents an integer of 0 to 7, n represents an integer of 0 to 3, p represents an integer of 0 to 4, q represents an integer of 0 to 6, and t represents an integer of 0 to 6.)

[3]
The oxygen absorbing agent composition according to [1] or [2], wherein a molecular weight of the compound (A) is from 276 to 1000.

[4]
The oxygen absorbing agent composition according to any one of [1] to [3], further comprising a carrier substance.

[5]
The oxygen absorbing agent composition according to [4], wherein the carrier substance is at least one selected from the group consisting of synthetic calcium silicate, diatom earth, silica and activated carbon.

[6]
The oxygen absorbing agent composition according to [4] or [5], comprising from 10 to 1000 parts by mass of the carrier substance based on 100 parts by mass of the compound (A).

[7]
The oxygen absorbing agent composition according to any one of [1] to [6], wherein the transition metal catalyst comprises at least one transition metal selected from the group consisting of manganese, iron, cobalt, nickel and copper.

[8]
The oxygen absorbing agent composition according to any one of [1] to [7], wherein the transition metal catalyst is contained in an amount of from 0.001 to 10 parts by mass in terms of the transition metal amount, based on 100 parts by mass of the compound (A).

[9]
An oxygen absorbing agent package comprising the oxygen absorbing agent composition according to any one of [1] to [8], and an air permeable packaging material to package the oxygen absorbing agent composition.

Advantageous Effects of the Invention

According to the present invention, it is possible to provide a novel oxygen absorbing agent composition being capable of realizing an oxygen absorbing agent not responding to a metal detector, being free from the occurrence of odor before and after the absorption of oxygen and having an excellent oxygen absorption performance, and an oxygen absorbing agent package using the novel oxygen absorbing agent composition. The oxygen absorbing agent composition and the like can absorb oxygen irrespective as to whether or not the object to be stored has moisture, and in addition, is free from the occurrence of odor before and after the absorption of oxygen, and hence can be used, without discriminating the application objects, over a wide range of applications to, for example, food, prepared food, beverages, pharmaceuticals and health food.

MODES FOR CARRYING OUT THE INVENTION

Hereinafter, the mode for carrying out the present invention (hereinafter, simply referred to as "the present embodiment") is described in detail. The following present embodiment is presented as exemplification for describing the present invention, and the present invention is not intended to be limited only to the following contents. The present invention can be carried out as appropriately modified within the scope of the gist of the present invention.

(Oxygen Absorbing Agent Composition and the Like)

The oxygen absorbing agent composition of the present embodiment includes a compound (A) having two or more tetralin rings and a transition metal catalyst. The oxygen absorbing agent composition of the present embodiment can exhibit an excellent oxygen absorbing capacity even at a high humidity or even at a low humidity. The occurrence of odor can also be suppressed. Moreover, the oxygen absorbing agent composition of the present embodiment need not use iron for absorbing oxygen, and hence can be a non-iron-based oxygen absorbing agent composition (substantially not containing iron).

As the compound (A), the compound is preferable which is represented by at least any one formula selected from the group consisting of the following general formulas (1) to (6), from the viewpoint of the easy availability of the raw material.

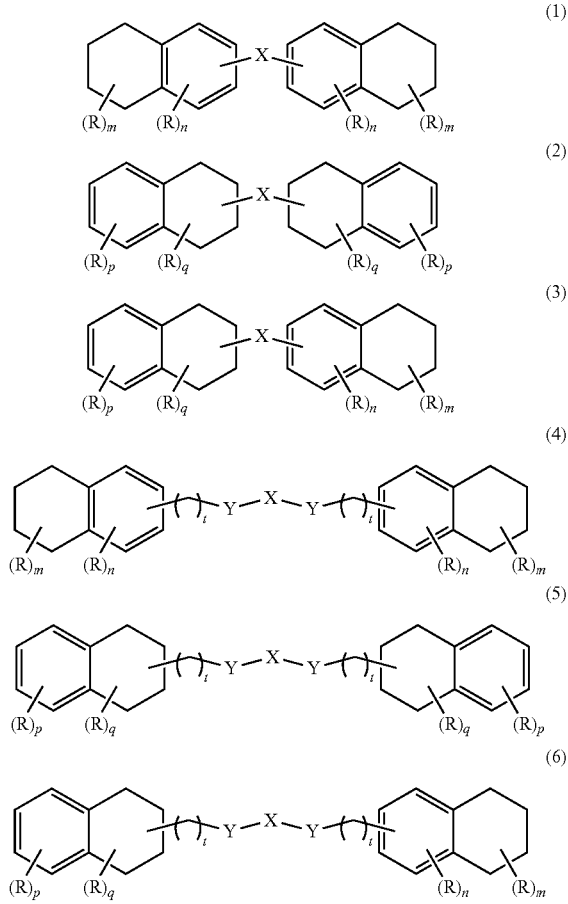

(wherein R each independently represents a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group; R may each further have a substituent; one or more hydrogen atom is bonded to a benzylic position of at least one tetralin ring; X represents a divalent group containing at least one group selected from the group consisting of an aromatic hydrocarbon group, a saturated or unsaturated alicyclic hydrocarbon group, a linear or branched saturated or unsaturated aliphatic hydrocarbon group and a heterocyclic group; Y represents an ester group or an amide group; and m represents an integer of 0 to 7, n represents an integer of 0 to 3, p represents an integer of 0 to 4, q represents an integer of 0 to 6, and t represents an integer of 0 to 6.)

Examples of R in the general formulas (1) to (6) may include: a hydrogen atom, halogen atoms (such as a chlorine atom, a bromine atom and an iodine atom), alkyl groups (linear, branched or cyclic alkyl groups having 1 to 15 carbon atoms, preferably 1 to 6 carbon atoms, such as a methyl group, an ethyl group, an n-propyl group, an isopropyl group, a t-butyl group, an n-octyl group, a 2-ethylhexyl group, a cyclopropyl group and a cyclopentyl group), alkenyl groups (linear, branched or cyclic alkenyl groups having 2 to 10 carbon atoms, preferably 2 to 6 carbon atoms, such as a vinyl group and an allyl group), alkynyl groups (alkynyl groups having 2 to 10 carbon atoms, preferably 2 to 6 carbon atoms, such as an ethynyl group and a propargyl group), aryl groups (aryl groups having 6 to 16 carbon atoms, preferably 6 to 10 carbon atoms, such as a phenyl group and a naphthyl group), heterocyclic groups (monovalent groups obtained by eliminating one hydrogen atom from 5-membered ring or 6-membered ring aromatic or non-aromatic heterocyclic compounds having 1 to 12 carbon atoms, preferably 2 to 6 carbon atoms, such as a 1-pyrazolyl group, a 1-imidazolyl group and a 2-furyl group), a cyano group, a hydroxy group, a carboxyl group, ester groups, amide groups, a nitro group, alkoxy groups (linear, branched or cyclic alkoxy groups having 1 to 10 carbon atoms, preferably 1 to 6 carbon atoms, such as a methoxy group and an ethoxy group), aryloxy groups (aryloxy groups having carbon 6 to 12 carbon atoms, preferably 6 to 8 carbon atoms, such as a phenoxy group), acyl groups (a formyl group, alkyl carbonyl groups having 2 to 10 carbon atoms, preferably having 2 to 6 carbon atoms, and aryl carbonyl groups having 7 to 12 carbon atoms, preferably 7 to 9 carbon atoms, such as an acetyl group, a pivaloyl group and a benzoyl group), amino groups (alkyl amino groups having 1 to 10 carbon atoms, preferably 1 to 6 carbon atoms, anilino groups having 6 to 12 carbon atoms, preferably 6 to 8 carbon atoms, and heterocyclic amino groups having 1 to 12 carbon atoms, preferably 2 to 6 carbon atoms, such as an amino group, a methyl amino group and an anilino group), thiol groups, alkylthio groups (alkylthio groups having 1 to 10 carbon atoms, preferably 1 to 6 carbon atoms, such as a methylthio group and an ethylthio group), arylthio groups (arylthio groups having 6 to 12 carbon atoms, preferably 6 to 8 carbon atoms, such as a phenylthio group), heterocyclic thio groups (heterocyclic thio groups having 2 to 10 carbon atoms, preferably 1 to 6 carbon atoms, such as a 2-benzothiazolyl-thio group), and imide groups (imide groups having 2 to 10 carbon atoms, preferably 4 to 8 carbon atoms, such as an N-succinimide group and an N-phthalimide group).

Among these, from the viewpoint of the easy availability of the raw materials and the synthesis easiness, R is preferably a hydrogen atom, a substituted or unsubstituted alkyl group, a substituted or unsubstituted aryl group, a hydroxy group, a carboxyl group, an ester group, an alkoxy group, an acyl group, an amide group, or an imide group, more preferably a hydrogen atom, a substituted or unsubstituted alkyl group, a substituted or unsubstituted aryl group, an alkoxy group, an ester group or an acyl group, and furthermore preferably a hydrogen atom, an unsubstituted alkyl group, an alkoxy group or an ester group.

Examples of X in the general formulas (1) to (6) may include a divalent group containing at least one group selected from the group consisting of an aromatic hydrocarbon group, a saturated or unsaturated alicyclic hydrocarbon group, a linear or branched, saturated or unsaturated aliphatic hydrocarbon group and a heterocyclic group. The aromatic hydrocarbon group, the saturated or unsaturated alicyclic hydrocarbon group, the linear or branched, saturated or unsaturated aliphatic hydrocarbon group and the heterocyclic group may be substituted or unsubstituted. X may contain a hetero atom, and may also contain, for example, an ether group, a sulfide group, a carbonyl group, a hydroxy group, an amino group, a sulfoxide group or a sulfone group.

Examples of the aromatic hydrocarbon group may include, but are not limited to, an o-phenylene group, a m-phenylene group, a p-phenylene group, a methyl phenylene group, an o-xylylene group, a m-xylylene group, a p-xylylene group, a naphthylene group, an anthracenylene group, a phenanthrylene group, a biphenylene group and a fluonylene group.

Examples of the alicyclic hydrocarbon group may include, but are not limited to, cycloalkylene groups such as a cyclopentylene group, a cyclohexylene group, a methylcyclohexylene group, a cycloheptylene group and a cyclooctylene group; and cycloalkenylene groups such as a cyclohexenylene group.

Examples of the aliphatic hydrocarbon group may include, but are not limited to, linear or branched alkylene groups such as a methylene group, an ethylene group, a trimethylene group, a propylene group, an isopropylidene group, a tetramethylene group, an isobutylidene group, a sec-butylidene group, a pentamethylene group, a hexamethylene group, a heptamethylene group, an octamethylene group, a nonamethylene group and a decamethylene; and alkenylene groups such as a vinylene group, a propenylene group, a 1-butenylene group, a 2-butenylene group, a 1,3-butadienylene group, a 1-pentenylene group, a 2-pentenylene group, a 1-hexenylene group, a 2-hexenylene group and a 3-hexenylene group.

These groups may each further have a substituent. Specific examples of such a substituent may include, but are not limited to, a halogen atom, an alkoxy group, a hydroxy group, a carboxyl group, a carboalkoxy group, an amino group, an acyl group, a thio group (such as an alkylthio group, a phenylthio group, a tolylthio group or a pyridylthio group), an amino group (such as an unsubstituted amino group, a methylamino group, a dimethylamino group or a phenylamino group), a cyano group and a nitro group.

Examples of Y in the general formulas (1) to (6) may include an ester group and an amide group.

The molecular weight of the compound (A) of the present embodiment is preferably 276 to 1000. The lower limit of the molecular weight is more preferably 300 or more and furthermore preferably 350 or more. When the molecular weight is equal to or larger than the lower limit, the loss due to volatilization during use can be preferably further suppressed. The upper limit of the molecular weight is more preferably 800 or less and furthermore preferably 600 or less. When the upper limit of the molecular weight is equal to or less than the above-described upper limit, the proportion of the tetralin ring moieties in the compound (A) tends to be high, and the oxygen absorption amount per unit mass of the compound (A) preferably tends to be further larger.

The oxygen absorbing agent composition of the present embodiment is free from the occurrence of odor before and after the absorption of oxygen. The reason for this is not clear, but the following oxidation reaction mechanism is inferred to be involved. It is interpreted that in the compound (A) of the present embodiment, first the hydrogen atom located at the benzylic position of the tetralin ring is abstracted to produce a radical, and subsequently, the reaction between the radical and oxygen oxidizes the carbon atom at the benzylic position to produce a hydroxy group or a ketone group. In other words, it is inferred that the compound (A) of the present embodiment has such a structure as described above, consequently does not involve the breakage of the molecular chain due to oxidation reaction, thus maintains the structure thereof, and hence can further suppress the production of a low molecular weight organic compound to be a cause for odor. From such a viewpoint, in the compound (A), preferably one or more hydrogen atom is bonded to the benzylic position of at least one tetralin ring, more preferably one or more hydrogen atom is bonded to the benzylic position of each of at least two tetralin rings, and furthermore preferably one or more hydrogen atom is bonded to the benzylic position of each of all the tetralin rings.

The compound (A) of the present embodiment preferably has a high boiling point and a low vapor pressure at the temperature of use. By using such a compound (A), the loss due to volatilization during use can be suppressed. When the compound (A) is used as the below-described oxygen-absorbing resin composition, the compound (A) having the lower vapor pressure at the temperature in the kneading with the thermoplastic resin and the higher 3% weight loss temperature is the more preferable because the loss, due to volatilization, of the compound at the time of the production of the oxygen-absorbing resin composition can be suppressed. From such a viewpoint as described above, the 3% weight loss temperature of the compound (A) is preferably 150° C. or higher, more preferably 200° C. or higher and furthermore preferably 250° C. or higher.

Among the above-described functional groups, the functional groups having a hydrogen atom may further be substituted with the above-described groups. Specific examples of such substituted functional groups may include, but are not limited to, alkyl groups substituted with a hydroxy group (such as a hydroxyethyl group), alkyl groups substituted with an alkoxy group (such as a methoxy ethyl group), alkyl groups substituted with an aryl group (such as a benzyl group), aryl groups substituted with an alkyl group (such as a p-tolyl group), and aryloxy groups substituted with an alkyl group (such as a 2-methyl phenoxy group).

In the case of a substituted functional group, the number of carbon atoms in the additional substituent is not included in the above-described number of the carbon atoms. For example, a benzyl group is regarded as an alkyl group having one carbon atom, substituted with a phenyl group, but not as an alkyl group having 7 carbon atoms, substituted with a phenyl group. The substituent of the tetralin having a substituent may have a plurality of substituents.

A specific example of the compound (A) is preferably a compound represented by at least any one formula selected from the group consisting of the following general formulas (7) to (16), and more preferably a compound represented by at least any one formula selected from the group consisting of the following general formulas (7), (10), (13) and (16).

(7)
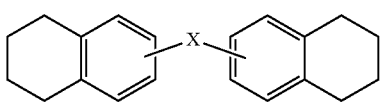

(8)
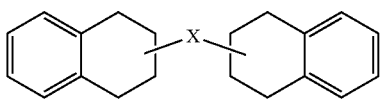

(9)
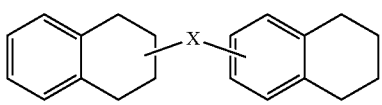

(10)
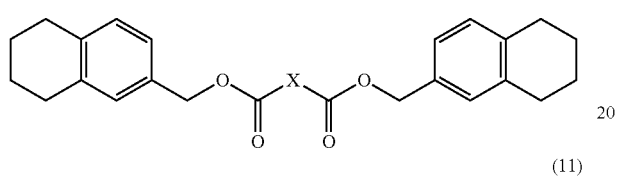

(11)
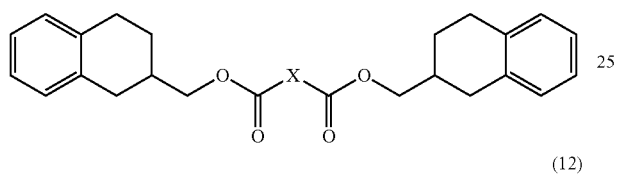

(12)
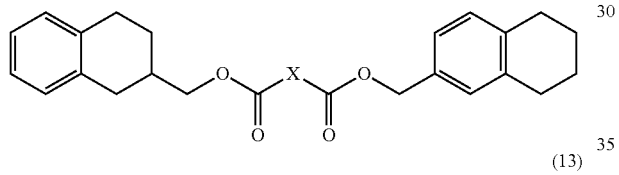

(13)
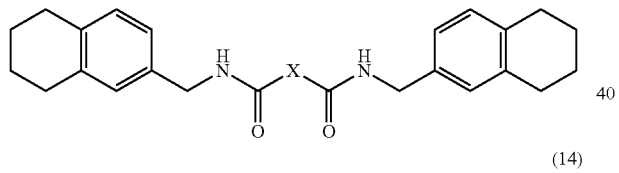

(14)
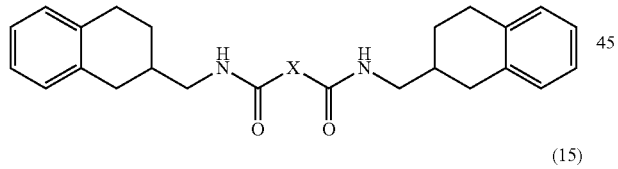

(15)
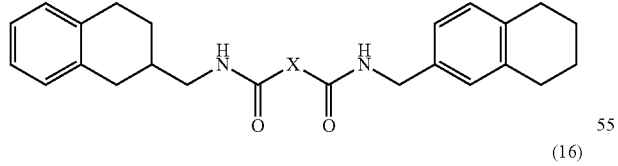

(16)
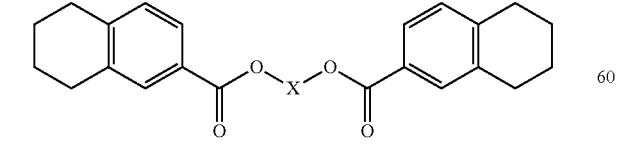

(wherein X represents an aromatic hydrocarbon group, a saturated or unsaturated alicyclic hydrocarbon group, or a linear or branched, saturated or unsaturated aliphatic hydrocarbon group. Specific examples of X may include the examples quoted as specific examples of X in the formulas (1) to (6).)

Preferable specific examples of the general formula (7) are shown below, but the present embodiment is not limited to these.

(17)
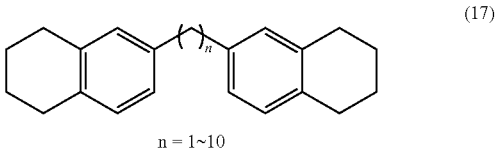
n = 1~10

(18)
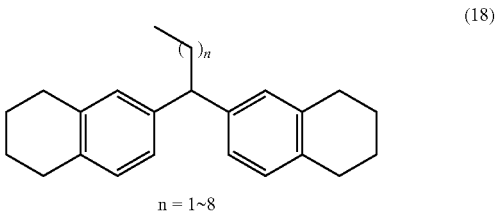
n = 1~8

(19)
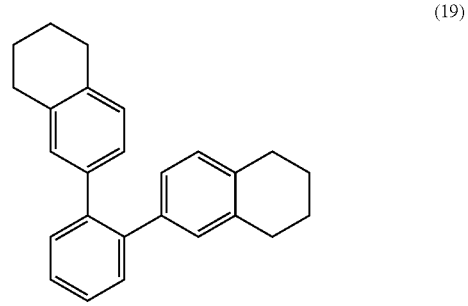

(20)
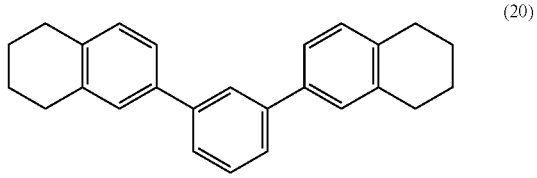

(21)
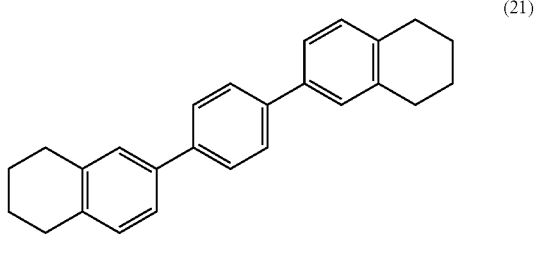

Preferable specific examples of the general formula (10) are shown below, but the present embodiment is not limited to these.

(22)
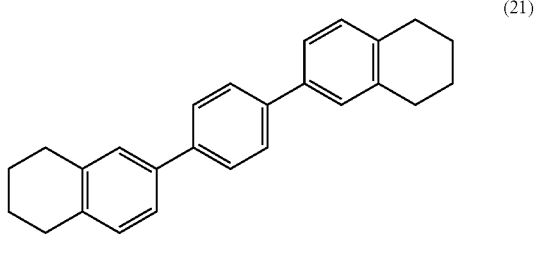
n = 1~8

(23)

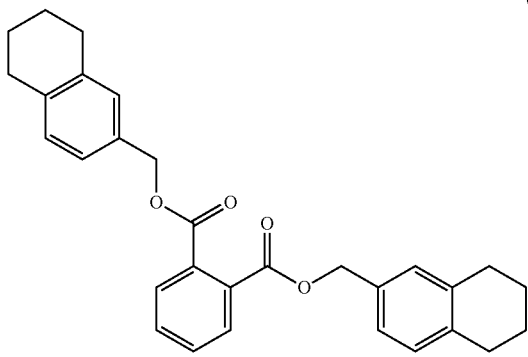

(24)

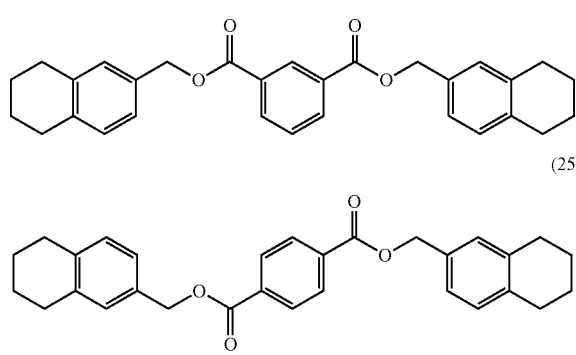

(25)

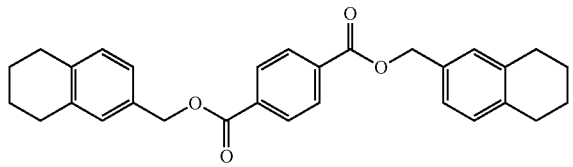

Preferable specific examples of the general formula (13) are shown below, but the present embodiment is not limited to these.

(26)

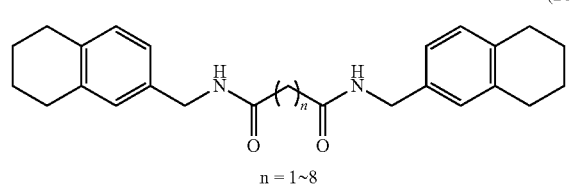

n = 1~8

(27)

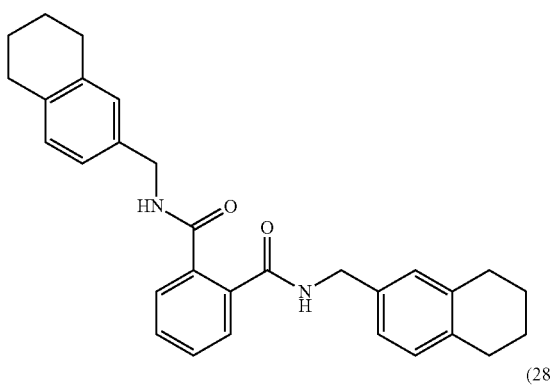

(28)

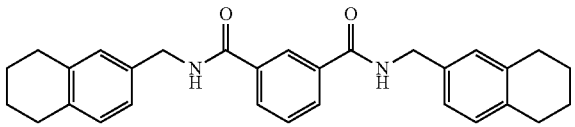 [SMILES: O=C(OCc1ccc2c(c1)CCCC2)c1cccc(C(=O)OCc2ccc3c(c2)CCCC3)c1]

(29)

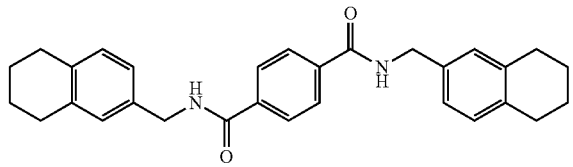

Preferable specific examples of the general formula (16) are shown below, but the present embodiment is not limited to these.

(30)

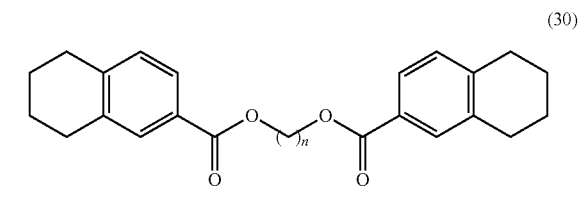

n = 1~10

(31)

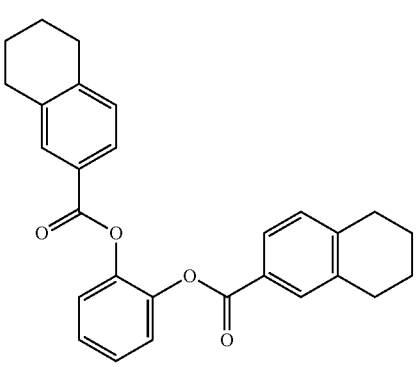

(32)

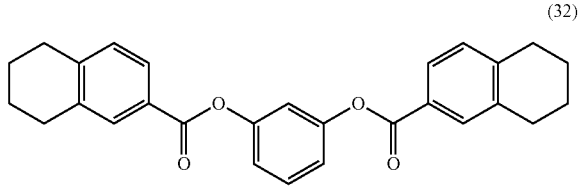

(33)

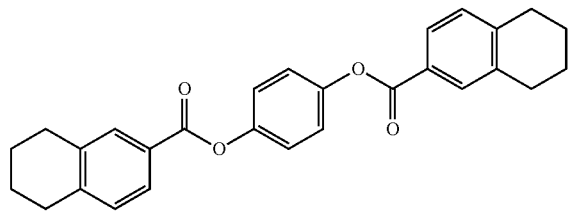

As an example of the compound having two tetralin rings in one molecule, each of the general formulas (1) to (33) is shown, but in the present embodiment, compounds each having three or more tetralin rings in one molecule are also preferably used.

The compounds (A) may be used each alone or in combinations of two or more thereof.

The method for producing the compound (A) of the present embodiment can be a heretofore known production method. Preferable examples of the method for producing the compound (A) may include: a transesterification reaction between an ester of a polycarboxylic acid having two or more carboxyl groups and a compound having a hydroxy group and a tetralin ring; a dehydration condensation reaction between a polyol having two or more hydroxy groups and a compound having a carboxyl group and a tetralin ring; and a reaction between aldehyde and a compound having a tetralin ring.

The transesterification reaction and the dehydration condensation reaction can be performed with heretofore known methods. The reaction temperature and the reaction time are not particularly limited as long as the reaction temperature and the reaction time fall within ranges allowing the transesterification reaction and the dehydration condensation reaction to proceed; however, the reaction temperature is preferably 50 to 300° C., and the reaction time is preferably 10 minutes to 24 hours. As the organic solvents used in the transesterification reaction and the dehydration condensation reaction, any organic solvents capable of dissolving the involved raw materials can be used without being particularly limited.

The transition metal catalyst used in the present embodiment is a catalyst capable of functioning as the catalyst for the oxidation reaction of the compound (A). Examples of the transition metal contained in the transition metal catalyst may include, but are not limited to, titanium, vanadium, chromium, manganese, iron, cobalt, nickel, copper, zinc, ruthenium and rhodium. Among these, from the viewpoint of the oxygen absorption performance, manganese, iron, cobalt, nickel and copper are preferable.

Examples of the transition metal catalyst may include organic acid salts, halides, phosphates, phosphites, hypophosphites, nitrates, sulfates, oxides and hydroxides of transition metals. Examples of the organic acid may include: acetic acid, propionic acid, octanoic acid, lauric acid, stearic acid, acetylacetone, dimethyldithio carbamic acid, palmitic acid, 2-ethylhexanoic acid, neodecanoic acid, linoleic acid, tall oil acid, oleic acid, capric acid and naphthenic acid. The transition metal catalysts can be used each alone or in combinations of two or more thereof.

From the viewpoint of the oxygen absorption amount of the oxygen absorbing agent composition, the mixing amount of the transition metal catalyst based on 100 parts by mass of the compound (A) is preferably 0.001 to 10 parts by mass in terms of the transition metal amount. The upper limit of the mixing amount of the transition metal catalyst based on 100 parts by mass of the compound (A) is more preferably 2 parts by mass or less and furthermore preferably 0.5 part by mass or less. The lower limit of the mixing amount of the transition metal catalyst based on 100 parts by mass of the compound (A) is more preferably 0.002 part by mass or more and furthermore preferably 0.01 part by mass or more in terms of the transition metal amount. When the upper limit of the content (in terms of the transition metal amount) of the transition metal catalyst is equal to or less than the above-described value, the upper limit is excellent in economic efficiency. When the lower limit of the content (in terms of the transition metal amount) of the transition metal catalyst is equal to or larger than the above-described value, a sufficient oxygen absorption amount can be ensured more certainly.

The oxygen absorbing agent composition of the present embodiment preferably further includes a carrier substance. In particular, when a carrier substance supports the compound (A), or both of the compound (A) and the transition metal catalyst, preferably the oxygen absorption rate can be further improved.

The method for allowing the carrier substance of the present embodiment to support the compound (A) or the transition metal catalyst is not particularly limited; however, for example, the following method can be used.

First, a mixed solution is prepared which contains the compound (A), or both of the compound (A) and the transition metal catalyst. When the compound (A) is not a liquid, a liquid containing the compound (A) is prepared by using a solvent, and when the compound (A) is a liquid, no solvent is required to be used. Next, in the prepared mixed solution, the carrier substance is immersed. When a solvent is used, the solvent is distilled off, and thus the carrier supporting the compound (A) or both of the compound (A) and the transition metal catalyst can be obtained. In particular, when the compound (A) or the transition metal catalyst is solid, by using such a solvent as described above, it is possible to allow the carrier substance to efficiently support the compound (A) or both of the compound (A) and the transition metal catalyst.

As the solvent to be used, from the viewpoint of, for example, the solubility of the compound (A), preferable are the organic solvents such as methanol, 2-propanol, ethylene glycol, toluene, xylene, methyl acetate, ethyl acetate, butyl acetate, diisopropyl ether, tetrahydrofuran, methyl ethyl ketone, dichloromethane and chloroform; and more preferable are methanol, 2-propanol, ethyl acetate and methyl ethyl ketone.

Specific examples of the carrier substance may include powders of synthetic calcium silicate, hydrated lime, activated carbon, zeolite, perlite, diatom earth, activated clay, silica, kaolin, talc, bentonite, activated alumina, gypsum, silica alumina, calcium silicate, magnesium oxide, graphite, carbon black, aluminum hydroxide and iron oxide. Among these, from the viewpoint of the oxygen absorption performance, synthetic calcium silicate, diatom earth, silica and activated carbon are preferably used. The carrier substances may be used each alone or in combinations of two or more thereof.

By allowing the carrier substance to support the compound (A) or both of the compound (A) and the transition metal catalyst, the contact area with oxygen can be made larger and the oxygen absorption rate or the oxygen absorption amount can be further increased, and additionally the handleability of the compound (A) or both of the compound (A) and the transition metal catalyst when used as the oxygen absorbing agent can also be further improved.

From the above-described viewpoint, the mixing amount of the carrier substance is preferably 10 to 1000 parts by mass and more preferably 20 to 800 parts by mass based on 100 parts by mass of the compound (A). By setting the mixing amount of the carrier substance to be equal to or less than the above-described upper limit, the oxygen absorption performance can be further improved. By setting the mixing amount of the carrier substance to be equal to or larger than the above-described lower limit, the handleability can further be improved.

As described later, the oxygen absorbing agent composition in which the carrier substance is allowed to support the compound (A) and the transition metal catalyst is filled in an air permeable packaging material, and may be used as a small bag-shaped oxygen absorbing agent package. As the air permeable packaging material, any packaging materials capable of being used in application to oxygen absorbing agents can be adopted without being particularly limited; however, from the viewpoint of sufficiently obtaining the oxygen absorption effect, an air permeable packaging material having a as high as possible air permeability is preferable. Specific preferable examples of the air permeable packaging material may include: papers such as Japanese paper, Western paper and rayon paper; non-woven fabrics using various fibers obtained from pulp, cellulose and synthesis resins; plastic films or perforated products thereof; or microporous films obtained by stretching after the addition of calcium carbonate or the like; and in addition, products obtained by laminating two or more selected from these. As the plastic film, for example, it is also possible to use a laminated film obtained by laminating on and bonding to each other a film of polyethylene terephthalate, polyamide, polypropylene or polycarbonate and a film, as a seal layer, of polyethylene, ionomer, polybutadiene, ethylene-acrylic acid copolymer, ethylene-methacrylic acid copolymer or ethylene-vinyl acetate copolymer.

The oxygen absorbing agent composition of the present embodiment may further include other additives such as a radical generating agent and a photoinitiator in order to promote the oxygen absorption reaction. Examples of the radical generating agent may include N-hydroxyimide compounds. Specific examples of the radical generating agent may include: N-hydroxysuccinimide, N-hydroxymaleimide, N,N'-dihydroxy-cyclohexane-tetracarboxylic acid diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy het acid imide, N-hydroxy hymic acid imide, N-hydroxy trimellitic acid imide and N,N-dihydroxy pyromellitic acid diimide. Examples of the photoinitiator may include: benzophenone and derivatives thereof, thiazine dyes, metal porphyrin derivatives and anthraquinone derivatives.

(Oxygen-Absorbing Resin Composition and the Like)

The oxygen absorbing agent composition of the present embodiment may further include a resin such as a thermoplastic resin (hereinafter, an oxygen absorbing agent composition including a resin is sometimes referred to as an "oxygen-absorbing resin composition"). Examples of the method for preparing an oxygen-absorbing resin composition include a method in which the above-described oxygen absorbing agent composition and a thermoplastic resin are kneaded with each other with an extruder. The kneading conditions can also be appropriately selected in consideration of, for example, the various physical properties of the raw materials to be used.

Examples of the thermoplastic resins may include: polyolefins such as low density polyethylene, medium density polyethylene, high density polyethylene, linear low density polyethylene, linear ultra low density polyethylene, polypropylene, poly-1-butene, poly-4-methyl-1-pentene, and random or block copolymers of α-olefins such as ethylene, propylene, 1-butene and 4-methyl-1-pentene; acid-modified polyolefins such as maleic anhydride graft polyethylene and maleic anhydride graft polypropylene; ethylene-vinyl compound copolymers such as ethylene-vinyl acetate copolymer, ethylene-vinyl alcohol copolymer, ethylene-vinyl chloride copolymer, ethylene-(meth)acrylic acid copolymer and ionically cross-linked products (ionomers) thereof, and ethylene-methyl methacrylate copolymer; styrene-based resins such as polystyrene, acrylonitrile-styrene copolymer and α-methyl styrene-styrene copolymer; polyvinyl compounds such as polymethyl acrylate and polymethyl methacrylate; polyamides such as nylon 6, nylon 66, nylon 610, nylon 12 and polymethaxylylene adipamide (MXD6); polyesters such as polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone and polyhydroxyalkanoate; polycarbonate; polyethers such as polyethylene oxide, or mixtures of these.

From the viewpoint of the oxygen absorption performance, and the moldability and exterior appearance of the resin, the content of the oxygen absorbing agent composition in the oxygen-absorbing resin composition is preferably 1 to 100% by mass, more preferably 2 to 80% by mass and furthermore preferably 5 to 50% by mass.

The oxygen-absorbing resin composition may include, within the ranges not impairing the advantageous effects of the present embodiment, additives such as a drying agent, a pigment, a dye, an antioxidant, a slipping agent, an antistatic agent, a stabilizer and a plasticizer; fillers such as calcium carbonate, clay, mica and silica; and deodorants. However, without being limited to the above-described additives, various materials can be mixed in the oxygen-absorbing resin composition.

The oxygen-absorbing resin composition may be molded into a single-layered packaging material, and the single-layered packaging material may further be processed into a single-layered packaging vessel. Alternatively, a multilayered body may also be produced which has a layer (oxygen absorbing layer) containing the oxygen-absorbing resin composition and another or other resin layers. Such a multilayered body can also be used as, for example, an oxygen absorbing multilayer packaging material or an oxygen absorbing multilayer packaging vessel. In these cases, the oxygen absorbing layer is preferably the inside layer (the layer on the inside) of the multilayered body, for example, in order that the oxygen-absorbing resin composition of the present embodiment may not be exposed to the outer surface of the vessel or the like, or may not be brought into direct contact with the object to be stored (the content). In this way, in a multilayered body at least provided with a layer (an oxygen absorbing layer) including the oxygen absorbing agent composition of the present embodiment, the oxygen absorbing layer is preferably an inside layer.

The oxygen-absorbing resin composition can also be used as processed into a film shape or a sheet shape. For example, the oxygen-absorbing resin composition can be used at least as an oxygen absorbing multilayer laminate having a sealant layer including a polyolefin resin, an oxygen absorbing layer including the oxygen-absorbing resin composition and a gas barrier layer including a gas barrier substance. Such an oxygen absorbing multilayer laminate can be used as an oxygen absorbing paper vessel in which a paper substrate is laminated on the outer layer of the gas barrier layer. Unless otherwise specified, a product having a thickness of 0.1 to 500 μm is referred to as a "film (shape)," and a product having a thickness exceeding 500 μm is referred to as a "sheet (shape)".

Examples of the gas barrier substance to be used in the gas barrier layer may include: a gas barrier thermoplastic resin; a gas barrier thermosetting resin; vapor deposited films of silica, alumina and aluminum; and metal foils such as an aluminum foil. Examples of the gas barrier thermoplastic resin may include ethylene-vinyl alcohol copolymer, polyamide MXD6 (metaxylene diamine/adipic acid copolymer)

and polyvinylidene chloride. Examples of the gas barrier thermosetting resin may include a gas barrier epoxy resin (for example, trade name "Maxive," manufactured by Mitsubishi Gas Chemical Company, Inc.).

As the method for producing the oxygen absorbing multilayer laminate, heretofore known methods such as a coextrusion method, various laminating methods and various coating methods can be used according to the properties of the materials, the processing purposes and the processing steps. Examples of the method for molding a film or a sheet may include a method in which a molten resin composition is extruded from an attached extruder through a T-die, a circular die or the like, and a method in which an oxygen absorbing film or an oxygen absorbing sheet is coated with an adhesive, and another film or sheet is laminated on the coated film or sheet. Alternatively, there can be adopted a method in which by coinjecting or successively injecting molten resin compositions into an injection mold from an injection machine through a multilayer multiple die, the molten resin composition is molded into a multilayer vessel having a predetermined shape or a preform for use in the production of a vessel. A stretched blow bottle is obtained by heating the preform at the stretching temperature, then stretching the preform in the axial direction, and at the same time, blow stretching the preform in the circumferential direction with the aid of fluid pressure.

The obtained oxygen absorbing multilayer laminate can be used as processed into a bag shape, a lid member or the like after the oxygen absorbing multilayer laminate is processed into a film. The oxygen absorbing multilayer laminate can also be heat molded into oxygen absorbing vessels each having a predetermined shape such as a tray, a cup, a bottle and a tube by applying molding methods such as vacuum molding, compressed-air molding and plug-assist molding, after the oxygen absorbing multilayer laminate is processed into a sheet. To the obtained bag-shaped vessel or the obtained cup-shaped vessel, for example, boiling sterilization treatment at 80 to 100° C., and semi-retort sterilization treatment, retort sterilization treatment and high retort sterilization treatment at 100 to 135° C. can be applied. The oxygen absorbing multilayer laminate can also be preferably used for a pouch provided with an easy-vapor-passing port, adaptable to cooking with a microwave oven, wherein the pouch is a bag-shaped vessel, filled with a content such as a food and provided with an opened port as the easy-vapor-passing port, and vapor is discharged from the opened port at the time of heating for cooking the content with a microwave oven.

(Oxygen Absorbing Agent Package)

The above-described oxygen absorbing agent composition or the above-described oxygen-absorbing resin composition can be used as an oxygen absorbing agent package by packaging each of these compositions with an air permeable packaging material. Specifically, examples of the oxygen absorbing agent package of the present embodiment may include an oxygen absorbing agent package provided with the above-described oxygen absorbing agent composition (or an oxygen-absorbing resin composition including the oxygen absorbing agent composition). The oxygen absorbing agent package of the present embodiment may use such an oxygen absorbing agent composition as described above, including no resin, or alternatively, may use an oxygen-absorbing resin composition in which a resin is mixed; in consideration of the intended applications, either of these compositions can be selected.

Examples of an aspect of the oxygen absorbing agent package of the present embodiment may include: a case in which the oxygen absorbing agent composition or the oxygen-absorbing resin composition is processed into a powdery material, a granular material, a pellet-shaped material, a film-shaped material, a sheet-shaped material or a small piece material other than these, and such a material is filled in an air permeable packaging material to prepare a small bag-shaped oxygen absorbing agent package. In particular, in the case of the oxygen absorbing agent package using the oxygen absorbing agent composition, packages using the oxygen absorbing agent composition as a powdery or granular material are preferably used. In the case of the oxygen absorbing agent package using the oxygen-absorbing resin composition, packages using the oxygen-absorbing resin composition as a film-shaped or sheet-shaped material are preferably used.

As the air permeable packaging material, any material having air permeability can be used without being particularly limited, but is preferably a packaging material having an as high as possible air permeability in order to sufficiently obtain the oxygen absorption effect. Specific examples of the air permeable packaging material may include: papers such as Japanese paper, Western paper and rayon paper; nonwoven fabrics using various fibers obtained from pulp, cellulose and synthesis resins; plastic films or perforated products thereof; and microporous films obtained by stretching after the addition of calcium carbonate or the like; and in addition, laminates obtained by laminating two or more selected from these. Needless to say, the above-described materials can be used as the air permeable packaging material when falling within a range allowing the advantageous effects of the present embodiment to be obtained.

Examples of the plastic film may include: a laminated film obtained by laminating on and bonding to each other a film of polyethylene terephthalate, polyamide, polypropylene or polycarbonate and a film of polyethylene, ionomer, polybutadiene, ethylene-acrylic acid copolymer, ethylene-methacrylic acid copolymer or ethylene-vinyl acetate copolymer. The edges of the sealing layer are bonded to each other to seal the edges of the laminated film, and in an oxygen absorbing agent can be packed in the resulting bag.

The shape of the air permeable packaging material is not particularly limited, and the air permeable packaging material may be appropriately molded into a suitable shape, for example, according to the application that uses the air permeable packaging material. For example, the air permeable packaging material is molded into a film shape or a sheet shape, and the molded air permeable packaging material is filled with the oxygen absorbing agent composition or the oxygen-absorbing resin composition, to be able to be used as oxygen absorbing bodies having shapes such as labels, cards and packings.

The oxygen absorbing agent composition of the present embodiment and the above-described individual aspects using this composition can undergo the promotion of the start of the oxygen absorption thereof or the enhancement of the oxygen absorption rate when used, by irradiation thereof with an energy ray. As the energy ray, for example, visible ray, ultraviolet ray, X-ray, electron beam and γ-ray can be used. The irradiation energy quantity can be appropriately selected according to the type of the energy ray to be used.

The oxygen absorbing agent composition of the present embodiment and the above-described individual aspects using this composition can absorb oxygen irrespective as to whether or not the object to be stored has moisture, and hence can be suitably used for: dried foods such as powdered seasoning, ground coffee, coffee beans, rice, tea, beans, fried rice cakes and rice crackers; pharmaceuticals; and health food such as vitamin preparations.

Additionally, examples of the object to be stored may include: rice processed products such as polished rice, cooked rice, glutinous rice boiled with red beans and rice cakes; prepared foods such as soup, stew and curry; fruits; confectioneries such as bars of sweet jellied adzuki-bean paste, puddings, cakes and buns with bean jam filling; fishery products such as tuna, fish and shellfish; dairy processed products such as cheese, butter and eggs; processed meat product such as meat, salami, sausage and ham; and vegetables such as carrot, potato, asparagus and shiitake mushroom. Examples of the object to be stored also may include beverages such as beer, wine, fruit juice and carbonated soft drinks.

EXAMPLES

Hereinafter, the present invention is described in more detail, with reference to Examples, but the present invention is not limited by these Examples.

(Synthesis Example 1) Diester Compound A Having Tetralin Rings

In a 300-mL reactor equipped with a thermometer, a partial condenser, a total condenser and a stirring device, 10.8 g (62 mmol) of dimethyl adipate, 30.0 g (185 mmol) of tetralinmethanol were placed, and the reaction mixture was increased in temperature to 130° C. To the reaction mixture, 58 mg (200 ppm in terms of Ti) of titanium tetrabutoxide monomer was added, and then reaction mixture was increased in temperature to 200° C. and was allowed to react while the produced methanol was being removed from the reaction system. After the production of methanol ceased, the reaction mixture was cooled to room temperature, the unreacted tetralinmethanol was removed under reduced pressure, and the diester compound A was obtained by recrystallization. By using a thermogravimetric/differential thermal analyzer (trade name "DTG-60," manufactured by Shimadzu Corp.), the 3% weight loss temperature of the obtained compound was measured. The measurement of the 3% weight loss temperature was performed by increasing the temperature to 500° C. at a temperature increase rate of 10° C./min. The structural formula and the 3% weight loss temperature of the obtained compound are shown in Table 1. As an example, the results of the NMR analysis are shown below. $^1$H-NMR (500 MHz CDCl$_3$) δ 7.02-7.09 (6H m), 5.52 (4H s), 2.68-2.78 (8H m), 2.27-2.39 (4H m), 1.73-1.84 (8H m), 1.60-1.69 (4H m). In following Synthesis Examples, unless otherwise specified, the structure of each of the compounds has been verified in the same manner.

(Synthesis Example 2) Diester Compound B Having Tetralin Rings

The diester compound B was obtained by performing the same operations as in Synthesis Example 1 except that dimethyl sebacate was used in place of dimethyl adipate and the weight of dimethyl sebacate was set at 14.3 g (62 mmol). The structural formula and the 3% weight loss temperature of the obtained compound are shown in Table 1. As an example, the results of the NMR analysis are shown below. $^1$H-NMR (500 MHz CDCl$_3$) δ 7.03-7.10 (6H m), 5.50 (4H s), 2.68-2.79 (8H m), 2.26-2.39 (4H m), 1.73-1.84 (8H m), 1.60-1.69 (4H m), 1.25-1.34 (8H m).

(Synthesis Example 3) Diester Compound C Having Tetralin Rings

The diester compound C was obtained by performing the same operations as in Synthesis Example 1 except that dimethyl succinate was used in place of dimethyl adipate and the weight of dimethyl succinate was set at 9.1 g (62 mmol). The structural formula and the 3% weight loss temperature of the obtained compound are shown in Table 1.

(Synthesis Example 4) Diester Compound D Having Tetralin Rings

The diester compound D was obtained by performing the same operations as in Synthesis Example 1 except that dimethyl phthalate was used in place of dimethyl adipate and the weight of dimethyl phthalate was set at 12.0 g (62 mmol). The structural formula and the 3% weight loss temperature of the obtained compound are shown in Table 1.

(Synthesis Example 5) Diester Compound E Having Tetralin Rings

The diester compound E was obtained by performing the same operations as in Synthesis Example 1 except that dimethyl isophthalate was used in place of dimethyl adipate and the weight of dimethyl isophthalate was set at 12.0 g (62 mmol). The structural formula and the 3% weight loss temperature of the obtained compound are shown in Table 1.

(Synthesis Example 6) Diester Compound F Having Tetralin Rings

The diester compound F was obtained by performing the same operations as in Synthesis Example 1 except that dimethyl terephthalate was used in place of dimethyl adipate and the weight of dimethyl terephthalate was set at 12.0 g (62 mmol). The structural formula and the 3% weight loss temperature of the obtained compound are shown in Table 1. As an example, the results of the NMR analysis are shown below. $^1$H-NMR (500 MHz CDCl$_3$) δ 8.06-8.14 (4H m), 7.04-7.22 (6H m), 5.30 (4H s), 2.70-2.87 (8H m), 1.74-1.87 (8H m).

(Synthesis Example 7) Unsaturated Hydrocarbon G Having Tetralin Rings

In a 500-mL reaction vessel equipped with a thermometer and a stirring device, 118.98 g (900 mmol) of tetralin and 17.3 g (180 mmol) of methanesulfonic acid were placed, and the air inside the reaction vessel was replaced with nitrogen. To the resulting mixture, 14.6 g (180 mmol in terms of formaldehyde) of formalin (a 37% aqueous solution of formaldehyde) was added dropwise at room temperature from a dropping funnel over 45 minutes. The mixture was stirred for 2 hours as it was, and then diluted with hexane; then an aqueous solution of NaHCO$_3$ was dropwise added to the mixture to terminate the reaction. The mixture was subjected to extraction with hexane, and the hexane was dried with magnesium sulfate and filtered. Then, the solvent was distilled off from the filtrate to yield a crude product. From the obtained crude product, tetralin was removed at a bath temperature of 150° C., under a pressure of 0 torr, and then the unsaturated hydrocarbon G was obtained by silica gel chromatography. The structural formula and the 3% weight loss temperature of the obtained compound are shown in Table 1.

(Synthesis Example 8) Unsaturated Hydrocarbon H Having Tetralin Rings

The unsaturated hydrocarbon H was obtained by performing the same operations as in the synthesis of Synthesis Example 7 except that in place of formalin (aqueous solution of formaldehyde), a 90% acetaldehyde aqueous solution was used and the weight of the aqueous solution was set at 8.8 g (in terms of acetaldehyde, 180 mmol). The structural formula and the 3% weight loss temperature of the obtained compound are shown in Table 1.

TABLE 1

| | Raw materials | |
|---|---|---|
| Diester compound A | HO-CH₂-(tetralin) | MeO₂C-(CH₂)₃-CO₂Me |
| Diester compound B | | MeO₂C-(CH₂)₇-CO₂Me |
| Diester compound C | | MeO₂C-(CH₂)₂-CO₂Me |
| Diester compound D | | dimethyl phthalate |
| Diester compound E | | dimethyl isophthalate |
| Diester compound F | | dimethyl terephthalate |
| Unsaturated hydrocarbon G | tetralin | HCHO (formaldehyde) |
| Unsaturated hydrocarbon H | | CH₃CHO (acetaldehyde) |

TABLE 1-continued

| Product | | 3% Weight loss temperature [° C.] | Molecular weight |
|---|---|---|---|
| Diester compound A | tetralin-CH₂-O-CO-(CH₂)₃-CO-O-CH₂-tetralin | 263 | 434.6 |
| Diester compound B | tetralin-CH₂-O-CO-(CH₂)₇-CO-O-CH₂-tetralin | 296 | 490.7 |
| Diester compound C | tetralin-CH₂-O-CO-(CH₂)₂-CO-O-CH₂-tetralin | 240 | 406.5 |
| Diester compound D | phthalate diester of bis(tetralinylmethyl) | 245 | 454.6 |
| Diester compound E | isophthalate diester of bis(tetralinylmethyl) | 262 | 454.6 |
| Diester compound F | terephthalate diester of bis(tetralinylmethyl) | 287 | 454.6 |
| Unsaturated hydrocarbon G | bis(tetralinyl)methane | 218 | 276.4 |
| Unsaturated hydrocarbon H | 2,2-bis(tetralinyl)propane (Me-substituted) | 232 | 290.5 |

Example 1

To 100 parts by mass of the diester compound A, 750 parts by mass of silica sol (trade name "MEK-ST 40D," manufactured by Nissan Chemical Industries, Ltd., the content of methyl ethyl ketone: 60% by mass) and cobalt 2-ethylhexanoate were added so as for the amount of cobalt to be 0.4 part by mass, the resulting mixture was stirred in a nitrogen atmosphere at 70° C. for 1 hour, methyl ethyl ketone was distilled off under reduced pressures to yield a powder, and thus a granular product (granular oxygen absorbing agent) was prepared.

Next, two gas barrier bags formed of an aluminum foil laminate film were prepared. Then, 1 g of the obtained granular oxygen absorbing agent was packed, together with 500 cc of air, in each of the two gas barrier bags. Then, the relative humidity in one of the two bags was regulated at 100%, the relative humidity of the other of the two bags was regulated at 30%, and the two bags were each sealed. The oxygen concentration inside the bag of each of the thus obtained sealed bodies was measured. Then, the sealed bodies were stored at 23° C. for 14 days, and the oxygen concentration inside the bag of each of the sealed bodies was measured. From these concentrations, the total amount of the oxygen absorbed by the oxygen absorbing agent for 14 days in each of the sealed bodies was calculated. From the calculated total amounts of oxygen, the oxygen absorption amount per 1 g of the oxygen absorbing agent ("cc/g-agent") in each of the sealed bodies and the oxygen absorption amount per 1 g of the compound ("cc/g-compound") in each of the sealed bodies were calculated. On the basis of the following evaluation standards, the organoleptic evaluation of the odor before and after the absorption of oxygen was performed. These measurement results are shown in Table 2.

⊚: The compound itself has no odor, and no odor is found either before or after the oxygen absorption.

○: The compound itself has somewhat odor, but no change of the odor is found either before or after the oxygen absorption.

x: The odor is increased after the absorption of oxygen.

Example 2

The measurement of the oxygen absorption amounts and the organoleptic evaluation of the odor before and after the absorption of oxygen were performed in the same manner as in Example 1 except that the diester compound A was altered to the diester compound B. These results are shown in Table 2.

Example 3

The measurement of the oxygen absorption amounts and the organoleptic evaluation of the odor before and after the absorption of oxygen were performed in the same manner as in Example 1 except that the diester compound A was altered to the diester compound C. These results are shown in Table 2.

Example 4

The measurement of the oxygen absorption amounts and the organoleptic evaluation of the odor before and after the absorption of oxygen were performed in the same manner as in Example 1 except that the diester compound A was altered to the diester compound D. These results are shown in Table 2.

Example 5

The measurement of the oxygen absorption amounts and the organoleptic evaluation of the odor before and after the absorption of oxygen were performed in the same manner as in Example 1 except that the diester compound A was altered to the diester compound E. These results are shown in Table 2.

Example 6

The measurement of the oxygen absorption amounts and the organoleptic evaluation of the odor before and after the absorption of oxygen were performed in the same manner as in Example 1 except that the diester compound A was altered to the diester compound F. These results are shown in Table 2.

Example 7

To 100 parts by mass of the unsaturated hydrocarbon G, cobalt 2-ethylhexanoate was added so as for the amount of cobalt to be 0.1 part by mass and stirred to prepare a solution. The solution was impregnated into 133 parts by mass of diatom earth (trade name "RC417," manufactured by Showa Chemical Industry Co., Ltd.) to prepare a granular product (granular oxygen absorbing agent). The measurement of the oxygen absorption amounts and the organoleptic evaluation of the odor before and after the absorption of oxygen were performed in the same manner as in Example 1 except that the packed amount of the granular oxygen absorbing agent was altered to 0.5 g. These results are shown in Table 2.

Example 8

The measurement of the oxygen absorption amounts and the organoleptic evaluation of the odor before and after the absorption of oxygen were performed in the same manner as in Example 7 except that the unsaturated hydrocarbon G was altered to the unsaturated hydrocarbon H. These results are shown in Table 2.

Reference Example 1

The measurement of the oxygen absorption amounts and the organoleptic evaluation of the odor before and after the absorption of oxygen were performed in the same manner as in Example 7 except that the unsaturated hydrocarbon G was altered to 1,5-dimethyltetralin. These results are shown in Table 2.

TABLE 2

| | Compound | Carrier substance | Transition metal catalyst (in terms of metal amount) | Carrier substance | Oxygen absorption amount[1] cc/g-agent | | Oxygen absorption amount[2] cc/g-compound | | Odor |
|---|---|---|---|---|---|---|---|---|---|
| | | | | | Humidity 100% | Humidity 30% | Humidity 100% | Humidity 30% | |
| Example 1 | Diester compound A | Silica | 0.4 | 300 | 25 | 28 | 100 | 112 | ◎ |
| Example 2 | Diester compound B | Silica | 0.4 | 300 | 33 | 42 | 132 | 168 | ◎ |
| Example 3 | Diester compound C | Silica | 0.4 | 300 | 23 | 25 | 92 | 100 | ◎ |
| Example 4 | Diester compound D | Silica | 0.4 | 300 | 19 | 15 | 76 | 60 | ◎ |
| Example 5 | Diester compound E | Silica | 0.4 | 300 | 25 | 12 | 100 | 48 | ◎ |
| Example 6 | Diester compound F | Silica | 0.4 | 300 | 3 | 2 | 12 | 8 | ◎ |
| Example 7 | Unsaturated hydrocarbon G | Diatom earth | 0.1 | 133 | 47 | 29 | 110 | 68 | ◎ |
| Example 8 | Unsaturated hydrocarbon H | Diatom earth | 0.1 | 133 | 38 | 18 | 89 | 42 | ◎ |
| Reference Example 1 | 1,5-Dimethyltetralin | Diatom earth | 0.1 | 133 | 85 | 86 | 198 | 200 | ○ |

[1] Total amount of oxygen absorbed during 14 days from the start of the test (per 1 g of the oxygen absorbing agent).
[2] Total amount of oxygen absorbed during 14 days from the start of the test (per 1 g of the compound having tetralin rings).

As can be seen from the table, Examples each exhibited an excellent oxygen absorption performance both at a high humidity and at a low humidity, and are each verified to be free from the occurrence of odor before and after the absorption of oxygen.

The present application is based on Japanese Patent Application No. 2012-188565 which was filed with Japan Patent Office on Aug. 29, 2012, which is hereby incorporated by reference therein.

INDUSTRIAL APPLICABILITY

The oxygen absorbing agent composition and the oxygen absorbing agent package according to the present invention can be used as the oxygen absorbing agents not responding to a metal detector, are free from the occurrence of odor before and after the absorption of oxygen, have excellent oxygen absorption performance, and hence can be used, without discriminating the application objects, for various applications to, for example, food, prepared food, beverages, pharmaceuticals and health food.

What is claimed is:

1. An oxygen absorbing agent composition comprising:
a compound (A) having two or more tetralin rings; and
a transition metal catalyst;
wherein the compound (A) is a compound represented by at least any one selected from the group consisting of the following general formulas (1) to (6):

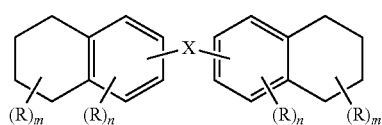
(1)

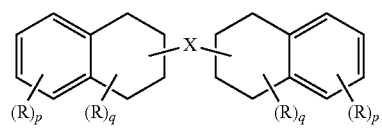
(2)

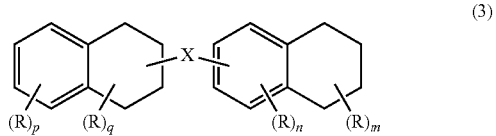
(3)

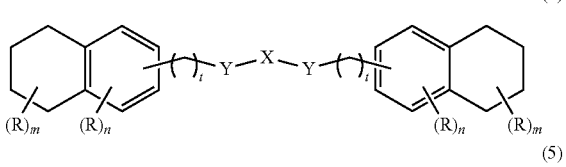
(4)

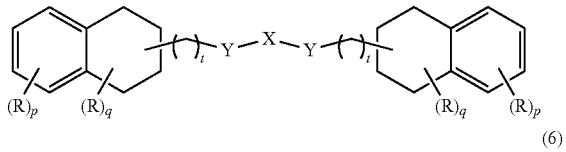
(5)

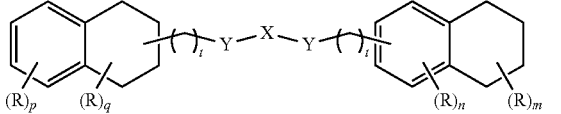
(6)

wherein R each independently represents a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group; R may each further have a substituent; one or more hydrogen atom is bonded to a benzylic position of at least one tetralin ring; X represents a divalent group containing at least one group selected from the group consisting of an aromatic hydrocarbon group, a saturated or unsaturated alicyclic hydrocarbon group, and a linear or branched saturated or unsaturated aliphatic hydrocarbon group; Y represents an ester group or an amide group; and m represents an integer of 0 to 7, n represents an integer of 0 to 3, p represents an integer of 0 to 4, q represents an integer of 0 to 6, and t represents an integer of 0 to 6.

2. The oxygen absorbing agent composition according to claim 1, wherein a molecular weight of the compound (A) is from 276 to 1000.

3. The oxygen absorbing agent composition according to claim 1, further comprising a carrier substance.

4. The oxygen absorbing agent composition according to claim 3, wherein the carrier substance is at least one selected from the group consisting of synthetic calcium silicate, diatom earth, silica and activated carbon.

5. The oxygen absorbing agent composition according to claim 3, comprising from 10 to 1000 parts by mass of the carrier substance based on 100 parts by mass of the compound (A).

6. The oxygen absorbing agent composition according to claim 1, wherein the transition metal catalyst comprises at least one transition metal selected from the group consisting of manganese, iron, cobalt, nickel and copper.

7. The oxygen absorbing agent composition according to claim 1, wherein the transition metal catalyst is contained in an amount of from 0.001 to 10 parts by mass in terms of the transition metal amount, based on 100 parts by mass of the compound (A).

8. An oxygen absorbing agent package comprising the oxygen absorbing agent composition according to claim 1, and an air permeable packaging material to package the oxygen absorbing agent composition.

\* \* \* \* \*

UNITED STATES PATENT AND TRADEMARK OFFICE
CERTIFICATE OF CORRECTION

PATENT NO. : 9,868,579 B2  
APPLICATION NO. : 14/424750  
DATED : January 16, 2018  
INVENTOR(S) : S. Ikeda et al.

Page 1 of 1

It is certified that error appears in the above-identified patent and that said Letters Patent is hereby corrected as shown below:

On the Title Page

(73) Assignee, "MITSIBISHI HAS CHEMICAL COMPANY, INC." should be -- MITSUBISHI GAS CHEMICAL COMPANY, INC. --.

Signed and Sealed this  
Twenty-seventh Day of March, 2018

Andrei Iancu  
*Director of the United States Patent and Trademark Office*